United States Patent
Ito et al.

(10) Patent No.: US 12,128,907 B2
(45) Date of Patent: Oct. 29, 2024

(54) CONTROL DEVICE FOR VEHICLE

(71) Applicants: J-QuAD DYNAMICS Inc., Tokyo (JP); National University Corporation Tokai National Higher Education and Research System, Aichi (JP)

(72) Inventors: Akira Ito, Tokyo (JP); Tatsuya Suzuki, Nagoya (JP); Hiroyuki Okuda, Nagoya (JP); Kohei Honda, Nagoya (JP)

(73) Assignees: J-QuAD DYNAMICS Inc., Tokyo (JP); National University Corporation Tokai National Higher Education and Research System, Aichi (JP)

( * ) Notice: Subject to any disclaimer, the term of this patent is extended or adjusted under 35 U.S.C. 154(b) by 205 days.

(21) Appl. No.: 17/808,521

(22) Filed: Jun. 23, 2022

(65) Prior Publication Data

US 2023/0100017 A1 Mar. 30, 2023

(30) Foreign Application Priority Data

Sep. 28, 2021 (JP) ................................. 2021-158118

(51) Int. Cl.
*B60W 50/00* (2006.01)
*B60W 60/00* (2020.01)

(52) U.S. Cl.
CPC ...... *B60W 50/0097* (2013.01); *B60W 60/001* (2020.02)

(58) Field of Classification Search
CPC .................... B60W 50/0097; B60W 60/001
(Continued)

(56) References Cited

U.S. PATENT DOCUMENTS

| 9,568,915 | B1 * | 2/2017 | Berntorp | B60W 30/095 |
| 10,579,063 | B2 * | 3/2020 | Haynes | G01S 13/726 |

(Continued)

FOREIGN PATENT DOCUMENTS

| CA | 2607002 C | * | 7/2011 | ............... B60T 8/17 |
| CN | 114670871 A | * | 6/2022 | |

(Continued)

OTHER PUBLICATIONS

C. Liu, S. Lee, S. Varnhagen and H. E. Tseng: Path Planning for Autonomous Vehicles using Model Predictive Control, IEEE Intelligent Vehicles Symposium, pp. 174-179, Jun. 11-14, 2017, Redondo Beach, CA, USA.

(Continued)

*Primary Examiner* — Atul Trivedi
(74) *Attorney, Agent, or Firm* — Studebaker & Brackett PC

(57) ABSTRACT

A control device includes a model generation unit that generates a control model that formulates a task to be executed, and a task processing unit that causes the vehicle to execute the task by performing model prediction control using the control model. Assuming that a first state space is a state space of the control model used at an execution time of the first task, and a second state space is a state space of the control model used at an execution time of the second task, the task processing unit starts to cause the vehicle to execute the second task, after executing a transition process that is a process of making a value of a state variable that is commonly included in both the first state space and the second state space within a predetermined range that is allowed at the execution time of the second task.

5 Claims, 4 Drawing Sheets

(58) Field of Classification Search
USPC .......................................................... 701/23
See application file for complete search history.

(56) References Cited

U.S. PATENT DOCUMENTS

| | | | | |
|---|---|---|---|---|
| 10,800,427 | B2* | 10/2020 | Goldberg | B60W 30/18 |
| 11,029,693 | B2* | 6/2021 | Chen | G05D 1/0088 |
| 11,192,561 | B2* | 12/2021 | Chen | F02D 37/02 |
| 2019/0042859 | A1* | 2/2019 | Schubert | G05D 1/00 |
| 2019/0101930 | A1* | 4/2019 | Yadmellat | G05D 1/0276 |
| 2019/0378041 | A1* | 12/2019 | Dhansri | B60W 30/14 |
| 2020/0128066 | A1* | 4/2020 | Sugimoto | G06F 9/5072 |
| 2020/0174490 | A1* | 6/2020 | Ogale | G06N 3/045 |
| 2020/0201292 | A1* | 6/2020 | Cella | G05B 23/0259 |
| 2020/0216085 | A1* | 7/2020 | Bobier-Tiu | B60W 40/08 |
| 2020/0223423 | A1* | 7/2020 | Haskara | B60W 10/06 |
| 2020/0249637 | A1 | 8/2020 | Wee et al. | |
| 2020/0293009 | A1* | 9/2020 | Quirynen | G05B 13/041 |
| 2020/0331492 | A1 | 10/2020 | Itoh | |
| 2020/0406906 | A1* | 12/2020 | Omari | G05D 1/0223 |
| 2021/0055727 | A1* | 2/2021 | Goldman-Shenhar | G06F 18/23 |
| 2021/0179100 | A1* | 6/2021 | Fritz | B60W 30/10 |
| 2021/0181739 | A1* | 6/2021 | Chen | B60W 40/105 |
| 2021/0191407 | A1* | 6/2021 | Benisch | G06N 20/00 |
| 2021/0323578 | A1* | 10/2021 | Wang | B60W 50/045 |
| 2021/0334630 | A1* | 10/2021 | Lambert | G06N 3/047 |
| 2021/0389773 | A1* | 12/2021 | Gaidon | G05D 1/024 |
| 2022/0017086 | A1* | 1/2022 | Baric | G06T 7/73 |
| 2022/0204017 | A1* | 6/2022 | Barton-Sweeney | B60W 40/068 |
| 2022/0242401 | A1* | 8/2022 | Thompson | G06F 1/14 |
| 2022/0242422 | A1* | 8/2022 | Thompson | G08G 1/166 |
| 2022/0242441 | A1* | 8/2022 | Thompson | G06V 10/774 |
| 2022/0284306 | A1* | 9/2022 | Osogami | G06N 7/01 |
| 2022/0291690 | A1* | 9/2022 | Goyal | B60W 60/001 |
| 2022/0324476 | A1* | 10/2022 | Perumalla | B60W 40/09 |
| 2023/0001953 | A1* | 1/2023 | McAllister | G05B 13/0265 |
| 2023/0100017 | A1* | 3/2023 | Ito | B60W 60/001 701/23 |
| 2023/0102778 | A1* | 3/2023 | Kim | B60L 3/12 701/23 |
| 2023/0123322 | A1* | 4/2023 | Cella | G06Q 30/0202 700/29 |
| 2023/0192085 | A1* | 6/2023 | Woo | B60W 50/0097 701/22 |
| 2023/0234596 | A1* | 7/2023 | Woo | B60W 10/18 701/41 |
| 2023/0278593 | A1* | 9/2023 | Wang | B60W 30/06 701/26 |
| 2024/0034302 | A1* | 2/2024 | Dallas | B60W 40/068 |
| 2024/0043020 | A1* | 2/2024 | Rosman | B60W 50/06 |
| 2024/0075981 | A1* | 3/2024 | Wyciechowski | B60W 40/105 |

FOREIGN PATENT DOCUMENTS

| | | | | |
|---|---|---|---|---|
| DE | 102020216250 | B4 * | 11/2022 | |
| GB | 2552024 | A * | 1/2018 | B60K 31/0008 |
| JP | 2020-175886 | A | 10/2020 | |
| JP | 2020-529664 | A | 10/2020 | |
| JP | 2021-036390 | A | 3/2021 | |
| WO | WO-2023049124 | A1 * | 3/2023 | B60W 10/06 |

OTHER PUBLICATIONS

Q. Wang, B. Ayalew and T. Weiskircher: Predictive Maneuver Planning for an Autonomous Vehicle in Public Highway Traffic, IEEE Transactions on Intelligent Transportation Systems, vol. 20, No. 4, pp. 1303-1315 (2018).

* cited by examiner

CONTROL DEVICE FOR VEHICLE

BACKGROUND OF THE INVENTION

Field of the Invention

The present disclosure relates to a control device for a vehicle.

Description of the Related Art

In controlling movement of a vehicle, it is necessary to cause the vehicle to execute tasks to be performed by the vehicle sequentially while switching the tasks, to achieve an object, for example, "to reach a destination". When the vehicle is an autonomous driving vehicle, for example, the above described tasks can include "go straight", "lane change" and the like. Accordingly, it is required to construct a control system that can execute a plurality of tasks in a control device for a vehicle.

It is also conceivable to construct a huge control system that includes all tasks to be executed by the vehicle, as the control system like this. However, when such a control system is constructed, the entire control system has to be reconstructed when a new task is to be added, and low scalability becomes a problem. In addition, since the number of state variables for use in control becomes huge, a problem that the processing load of the control device increases can also arise.

As a method for solving the above problems, Japanese Patent Laid-Open No. 2020-175886 describes a method of modularizing a processing content of a task to be executed individually as the control system for each task and selecting and executing the module corresponding to the task. Japanese Translation of PCT International Application Publication No. 2020-529664 describes a method of preparing a plurality of sub controllers for executing tasks in advance, and activating and operating the sub-controller selected according to the type of task and the like.

In this way, if the control system is configured to be switched according to the task to be executed, it becomes easy to add a new task, and therefore, the problem of scalability as described above can be solved. Since the control system can be of the minimum scale required to execute the corresponding task, the processing load of the control device can also be reduced.

However, depending on the situations of the vehicle and surroundings thereof when switching the task, it may be difficult to switch the control system. For example, when switching the task to be executed by the autonomous driving vehicle from "go straight" to "lane change", if the lane change is started immediately, a collision between the vehicles may occur, depending on the position of another vehicle traveling in the destination lane.

It is also conceivable to construct a control system that includes all of "go straight" and "lane change" in order to avoid the problem like this. However, in that case, the number of control systems that are to be prepared in advance becomes huge, and the processing load of the control device also increases.

The present disclosure has an object to provide a control device that can suppress increase of a processing load while making it possible to smoothly perform switching of a task to be executed by a vehicle.

SUMMARY OF THE INVENTION

A control device according to the present disclosure is a control device for a vehicle, and includes a model generation unit that generates a control model that formulates a task to be executed by the vehicle, and a task processing unit that causes the vehicle to execute the task by performing model prediction control using the control model. When the task to be executed by the vehicle is switched from a first task to a second task, assuming that a first state space is a state space of the control model used at an execution time of the first task, and a second state space is a state space of the control model used at an execution time of the second task, the task processing unit starts to cause the vehicle to execute the second task, after executing a transition process that is a process of making a value of a state variable that is commonly included in both the first state space and the second state space within a predetermined range that is allowed at the execution time of the second task.

The allowable ranges in which the value of "a state variable that is commonly included" described above should be kept are different between the execution time of the first task and the execution time of the second task. Consequently, it is conceivable that the value of the state variable that is within the allowable range in the execution time of the first task are out of the allowable range when the task is switched to the second task.

However, in the control device of the above described configuration, the value of "a state variable that is commonly included" is made within the predetermined range that is allowed at the execution time of the second task by execution of the transition process. Since switching to the second task is performed after such a state is brought about, none of the state variables are out of the allowable range by switching of the task. Thereby, it becomes possible to smoothly perform switching of the task to be executed by the vehicle.

At an execution time of the transition process, the number of state variables of the like included in the control model may increase. However, since the increase of the state variables or the like is temporary, the processing load on the control device is suppressed on average.

According to the present disclosure, the control device is provided which can suppress increase of the processing load while making it possible to smoothly perform switching of the task to be executed by the vehicle.

DETAILED DESCRIPTION OF THE PREFERRED EMBODIMENT

Hereinafter, a present embodiment will be described with reference to the accompanying drawings. In order to facilitate understanding of explanation, same components in the respective drawings are assigned with same reference signs as much as possible, and redundant explanation is omitted.

A control device 10 according to the present embodiment is configured as a device for controlling an operation of a vehicle. As the vehicle that is an object to be controlled, for example, a vehicle traveling on a road, a drone flying in the air and the like can be cited. Hereinafter, a case in which the vehicle is an autonomous driving vehicle will be described, but a type of the vehicle that is the object to be controlled is not particularly limited.

Figure 1:
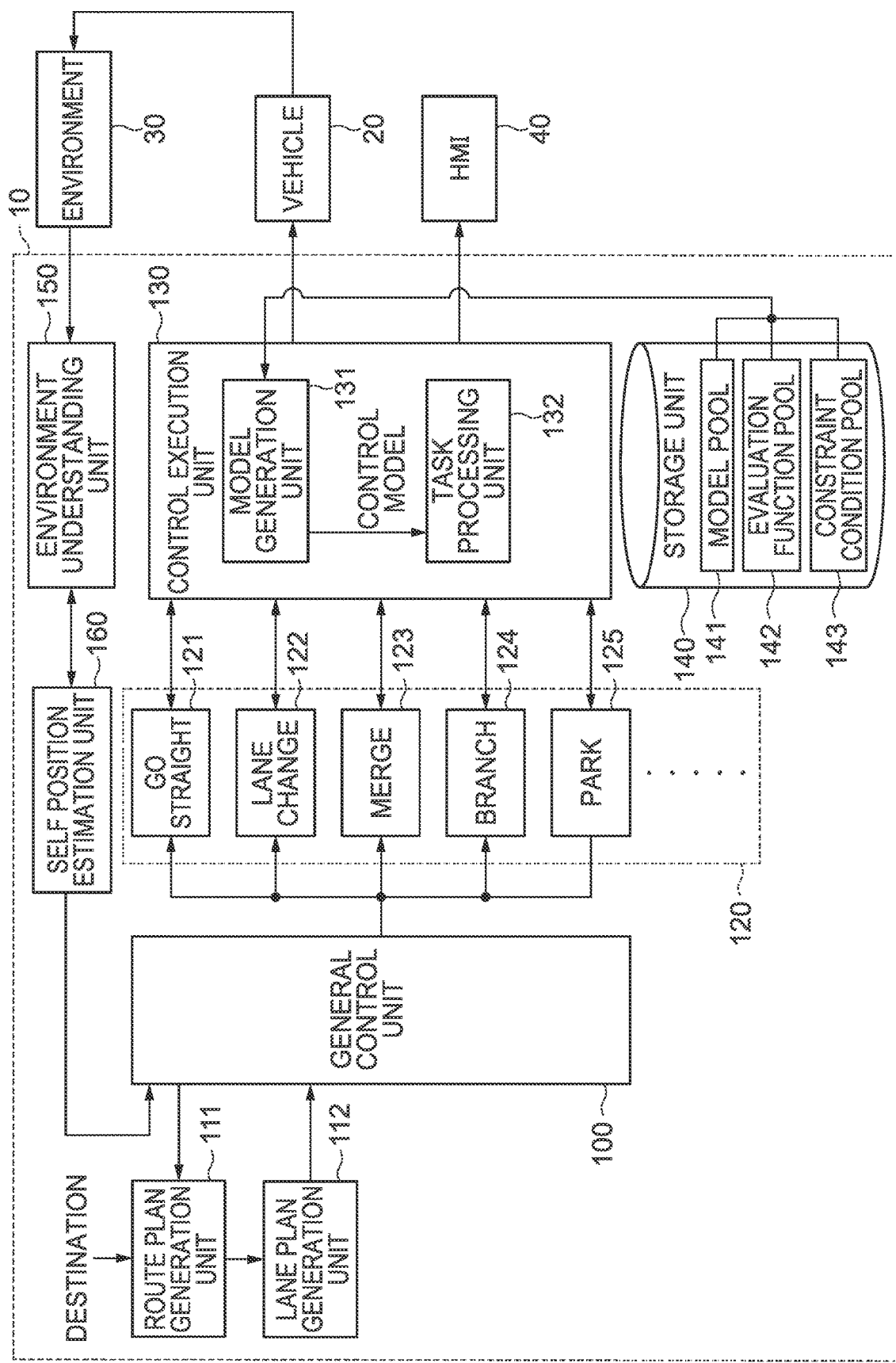
FIG. 1 is a diagram schematically showing a configuration of a control device according to a present embodiment as a block diagram.

FIG. 1 is a diagram schematically showing the configuration of the control device 10 as a block diagram. In FIG. 1, blocks representing a vehicle 20 that is an object to be controlled and the like are also illustrated. The vehicle 20 is a vehicle that is configured as an autonomous driving vehicle capable of autonomously traveling without depending on an operation of a driver. The control device 10 is responsible for all driving operations necessary to cause the vehicle 20 to travel, but may be responsible for only some of the necessary driving operations.

The control device 10 according to the present embodiment is configured as a computer system including a CPU, ROM, RAM and the like, and a whole of the entire control device 10 is mounted on the vehicle 20. However, the configuration of the control device 10 is not limited to the configuration like this. For example, a function of the control device 10 described as follows may be realized by a plurality of computer systems that perform interactive communication to each other. Further, all or some of functions of the control device 10 may be configured to be realized by a cloud server installed in a position different from a position of the vehicle 20.

As shown in FIG. 1, the control device 10 includes a general control unit 100, a task module unit 120, a control execution unit 130, a storage unit 140, an environment understanding unit 150, and a self position estimation unit 160 as functional blocks.

The general control unit 100 is a unit that generally controls an entire process that is performed by the control device 10, and functions as a so-called "supervisor". The general control unit 100 sets an object that is achieved by the vehicle 20 according to a request or the like that is inputted from a passenger, for example, and sets a plurality of tasks that should be sequentially executed to achieve the object.

In the above, a "request that is inputted" is a destination of the vehicle 20, for example. In this case, the "object that is achieved by the vehicle 20" is to cause the vehicle 20 to reach the destination. Further, "a plurality of tasks that should be sequentially executed to achieve the object" include go straight, lane change and the like, for example.

In an example in FIG. 1, a route plan generation unit 111 and a lane plan generation unit 112 are provided as blocks accompanying the general control unit 100. The route plan generation unit 111 is a unit that generates a route plan that is a plan indicating in what route the vehicle 20 should be caused to travel from a current location to a destination, according to the destination set by the passenger. The route plan generation unit 111 generates a route plan according to a request from the general control unit 100.

The route plane created in the route plan generation unit 111 is transmitted to the lane plan generation unit 112. The lane plan generation unit 112 is a unit that creates a lane plan that is a plan indicating in which lane (traffic lane) the vehicle 20 is caused to travel, in each part of the route that is indicated in the route plan. The created lane plan is transmitted to the general control unit 100.

The general control unit 100 realizes traveling of the vehicle 20 along the above lane plan, for example, by causing the vehicle 20 to execute necessary tasks sequentially while switching the necessary tasks. The general control unit 100 transmits action instructions to respective units of the task module unit 120 that will be described next, and thereby causes the respective units to execute respective tasks.

The task module unit 120 is a unit that causes the vehicle 20 to execute tasks based on the above described action instructions that are transmitted from the general control unit 100. In the present embodiment, the processes that are required to execute the tasks are divided and modularized for each of the tasks, and the task module unit 120 is a collection of the modules. In FIG. 1, reference sings "121" to "125" are assigned to the respective blocks representing the modules. For example, a block assigned with reference sign "121" represents a module that causes the vehicle 20 to execute a task of "go straight". A block assigned with reference sign "122" represents a module that causes the vehicle 20 to execute a task of "lane change". The task module unit 120 has many modules as described above, but in FIG. 1, only some of the modules are illustrated.

When causing the vehicle 20 to execute the task of "lane change" sequentially after the task of "go straight", for example, the general control unit 100 transmits an action instruction to the block assigned with reference sign "121" first and causes the vehicle 20 to execute the task of "go straight" by the block. Thereafter, the general control unit 100 transmits an action instruction to the block assigned with reference sign "122" and causes the vehicle 20 to execute the task of "lane change" by the block.

The control execution unit 130 is a unit that executes control that is required to cause the vehicle 20 to execute the task, specifically, model prediction control. The respective blocks of the task module unit 120 input control conditions required to execute the corresponding tasks to the control execution unit 130. The control conditions include tracks on which the vehicle 20 should be caused to travel, a speed range which the vehicle 20 should keep, a positional relationship with the other vehicles and the like. The control execution unit 130 generates a control model that formulates a task and executes model prediction control by using the control model so that control that matches the control conditions that is inputted is performed. As described later, the control model includes state equations about the state of the vehicle 20 and its surroundings, an evaluation function for selecting an optimum amount of operation and the like.

The control execution unit 130 includes a model generation unit 131 and a task processing unit 132. The model generation unit 131 is a unit that performs a process of generating the control model formulating the task to be executed by the vehicle 20. The task processing unit 132 is a unit that performs the model prediction control by using the control model generated by the model generation unit 131, and thereby performs the process of causing the vehicle 20 to execute the task. Specific contents of the processes that are performed in the respective model generation unit 131 and task processing unit 132 will be described later.

In FIG. 1, a block assigned with reference sign "40" represents an interface for notifying the passenger of the vehicle 20 of information. As the interface like this, it is possible to use a touch panel or the like that is installed in a vehicle cabin, for example. The control device 10 can notify the passenger of a traveling situation, a traveling route and the like of the vehicle 20 via the interface. The information of which the passenger is notified may be transmitted from the control execution unit 130 as shown in FIG. 1 but may be transmitted from a different unit from the control execution unit 130.

The storage unit 140 is a nonvolatile storage device provided in the control device 10, and is, for example, HDD or SSD. In the storage unit 140, three databases that are constituted of a model pool 141, an evaluation function pool 142, and a constraint condition pool 143.

The model pool 141 is a database in which a plurality of model elements that are used when the model generation unit 131 generates a control model. The evaluation function pool 142 is a database in which a plurality of evaluation functions that are used at the execution time of the model prediction control. The constraint condition pool 143 is a database in which a plurality of constraint conditions in the execution time of the model prediction control are stored. Information stored in each of the databases is read by the model generation unit 131 as necessary, and is used as an element for generating the control model. In the storage unit 140, information other than the above described information may be stored.

A block assigned with reference sign "30" in FIG. 1 simply represents a surrounding environment (situation) that changes from moment to moment as the vehicle 20 travels. The block will be also described as the "environment 30" hereinafter. The information indicating the environment 30 is measured by various sensors such as cameras and radars that are mounted on the vehicle 20, and is inputted to the control device 10 as the information required for control, for example. A part of the information indicating the environment 30 may be acquired from surrounding vehicles by vehicle-to-vehicle communication or may be acquired from an infrastructure installed in the road by communication.

The environment understanding unit 150 is a unit that receives input of the above described information indicating the environment 30. The environment understanding unit 150 grasps various states in the vehicle 20 and the surroundings by properly processing the information. Some of the "states" grasped by the environment understanding unit 150 are inputted to the control execution unit 130 and is provided to the model prediction control executed by the task processing unit 132. Further, information indicating some of the "states" grasped by the environment understanding unit 150 is also inputted to the self position estimation unit 160.

The self position estimation unit 160 is a unit that estimates a current traveling position of the vehicle 20 based on the information inputted from the environment understanding unit 150. The traveling position estimated by the self position estimation unit 160 is inputted to the general control unit 100. Thereby, the general control unit 100 can properly perform a process (specifically, switching of tasks) required to cause the vehicle 20 to reach a destination while grasping the current traveling position of the vehicle 20.

A specific process that is executed by the control device 10 will be described. Hereinafter, an example of the case of causing the vehicle 20 to execute "go straight" and "lane change" in order will be described. The task of "go straight" that is executed first will also be referred to as a "first task" hereinafter, and the task of "lane change" that is subsequently executed will also be referred to as a "second task" hereinafter. A combination of the first task and the second task may be other than the above.

When the vehicle 20 is caused to execute either of the tasks, the model generation unit 131 generates the control model formalizing the task in advance. The control model includes a state equation as shown in Expression (1) below, for example.

[Expression 1]

$$\dot{X} = f(x, u) \quad (1)$$

In equation (1), "x" is a state vector having a plurality of state variables as elements. A type and a number of the state variables included in "x" are properly set according to the task. In this example, at the execution time of the first task, a state equation in which $x_{v1}$ shown in Equation (2) below is a state vector is formulated. At an execution time of the second task, a state equation in which $x_{v2}$ shown in equation (2) is the state vector is formulated.

[Expression 2]

$$x_{v1} = \begin{bmatrix} x_1 \\ x_2 \\ x_3 \\ x_4 \end{bmatrix}, x_{v2} = \begin{bmatrix} x_1 \\ x_2 \\ x_5 \\ x_6 \end{bmatrix} \quad (2)$$

In this example, $x_{v1}$ is a state vector having four state variables constituted of $x_1$, $x_2$, $x_3$ and $x_4$ as elements. A state space that is expressed as a range in which $x_{v1}$ can change, that is, a state space of the control model that is used at the execution time of the first task will also be referred to as a "first state space" hereinafter.

In this example, $x_{v2}$ is a state vector having four state variables constituted of $x_1$, $x_2$, $x_5$ and $x_6$ as elements. The state space that is expressed as a range in which $x_{v2}$ can change, that is, a state space of the control model that is used at the execution time of the second task will also be referred to as a "second state space" hereinafter.

Each of the state variables such as $x_1$ and $x_2$ is a parameter expressing a state that should be considered in the execution time of the model prediction control. When the vehicle that is an object to be controlled is the vehicle 20 as in the present embodiment, the state variables can include, for example, a following distance from another vehicle traveling ahead, a distance along a lateral direction to a white line indicating a lane boundary, a position of another vehicle traveling in an adjacent lane, and the like.

The number of elements of $x_{v1}$ and the number of elements of $x_{v2}$ are each larger than four actually, but for simplification, an example of the case in which each of the numbers of elements are four as in the above will be described.

In equation (1), "f" in a right side is a function indicating a relationship between "x" that is the state vector, and "u" representing an operation amount. When the vehicle that is an object to be controlled is the vehicle 20 as in the present embodiment, the operation amount "u" can include, for example, a steering angle, an accelerator opening degree and the like. "u" is a scaler but may be a vector.

When the vehicle 20 is caused to execute a task, the task processing unit 132 predicts a change of the state vector "x" corresponding to the operation amount "u" by using the state equation of Equation (1). An evaluation value is calculated by using an evaluation function, with respect to the change of the state vector "x" that is obtained. The task processing unit 132 calculates the change of the state vector and the evaluation value thereof with respect to each of the plurality of operation amounts "u", and adopts the operation amount "u" that makes the evaluation value smallest as an actual operation amount. The task processing unit 132 causes the vehicle 20 to execute the task while executing the control of repeating the above process at each control period, that is, model prediction control.

Figure 2:
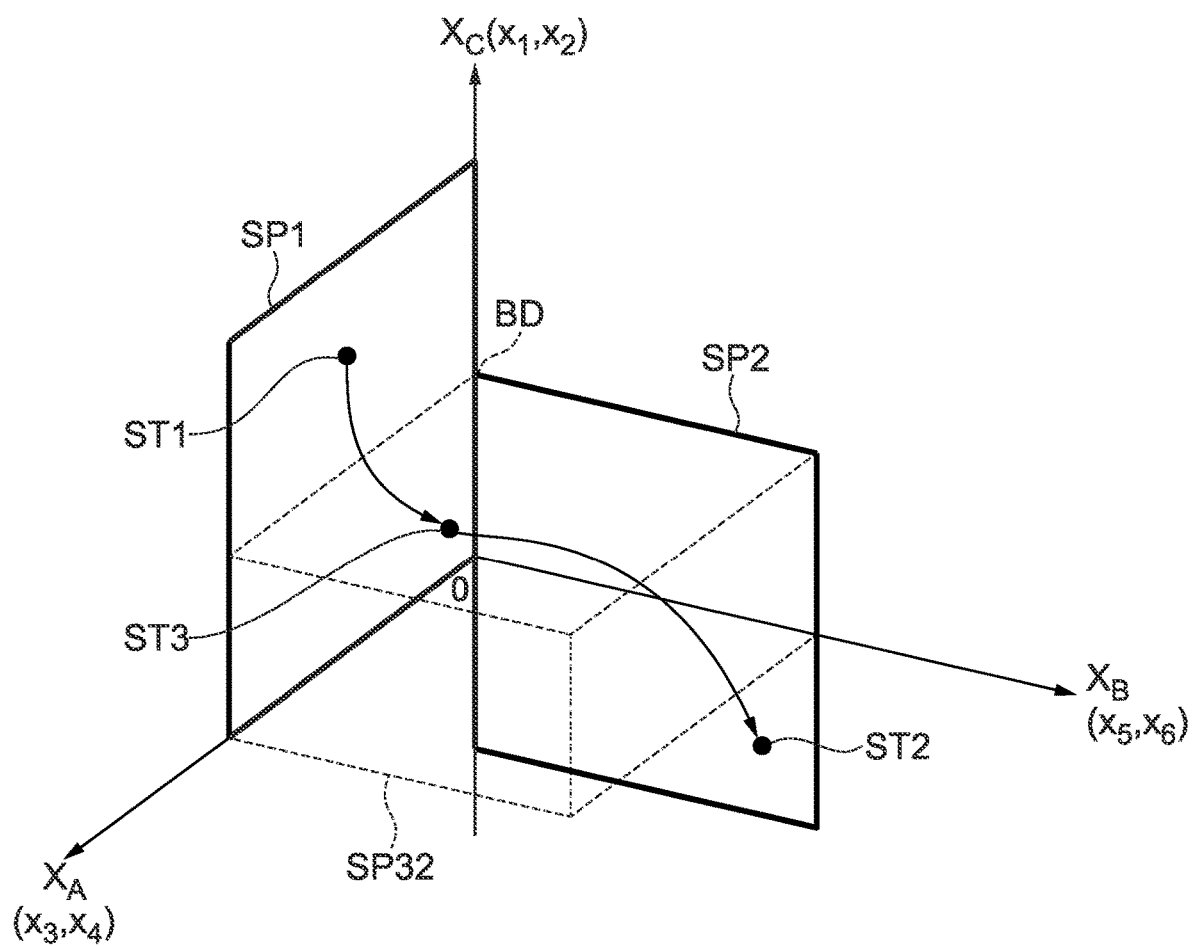
FIG. 2 is a diagram for explaining switching of a state space.

Referring to FIG. 2, control that is executed at a time of switching to the second task from the first task will be described. An axis $X_A$ shown in FIG. 2 is an axis indicating a state space expressed by state variables that are included in only $x_{v1}$ out of $x_{v1}$ and $x_{v2}$, that is two state variables of $x_3$ and $x_4$. Note that $X_A$ is actually a two-dimensional state space, but this is schematically illustrated as a uniaxial state space in FIG. 2.

An axis $X_B$ shown in FIG. 2 is an axis indicating a state space expressed by state variables that are included in only $x_{v2}$ out of $x_{v1}$ and $x_{v2}$, that is, two state variables of $x_5$ and $x_6$. Note that $X_B$ is actually a two-dimensional state space, but this is schematically illustrated as a uniaxial state space in FIG. 2.

An axis $X_C$ shown in FIG. 2 is an axis indicating a state space expressed by state variables that are included in both $x_{v1}$ and $x_{v2}$, that is, two state variables of $x_1$ and $x_2$. Note that $X_C$ is actually a two-dimensional state space, but this is schematically illustrated as uniaxial state space in FIG. 2. Since the first task and the second task are carried out consecutively, the common state variables like them always exist in both the tasks.

In FIG. 2, the first state space $(x_1, x_2, x_3, x_4)$ described above is expressed by an $X_A$-$X_C$ plane. Likewise, the second state space $(x_1, x_2, x_5, x_6)$ described above is expressed by an $X_B$-$X_C$ plane.

In the execution time of the first task, the respective state variables included in the state vector $x_{v1}$ change along the $X_A$-$X_C$ plane that is the first state space. A thick line assigned with reference sign "SP1" in FIG. 2 represents a range that is allowed with respect to the respective state variables that change in the execution time of the first task, in the first state space. A space inside of the range in the first state space will also be referred to as an "allowable range SP1" hereinafter. When causing the vehicle 20 to execute the first task, the model generation unit 131 formulates a predetermined constraint condition so that the state vector $x_{v1}$ does not deviate from the allowable range SP1, and includes this in the control model with the state equation of Expression (1). Thereby, when the task processing unit 132 causes the first task to be executed by using the control model, the state vector $x_{v1}$ changes along the $X_A$-$X_C$ plane inside of the allowable range SP1 shown in FIG. 2.

In the execution time of the second task, the respective state variables included in the state vector $x_{v2}$ change along the $X_B$-$X_C$ plane that is the second state space. A thick line assigned with reference sign "SP2" in FIG. 2 represents a range that is allowed with respect to the respective state variables that change in the execution time of the second task, in the second state space. A space inside of the range, in the second state space will also be referred to as an "allowable range SP2" hereinafter. When causing the vehicle 20 to execute the second task, the model generation unit 131 formulates a predetermined constraint condition so that the state vector $x_{v2}$ does not deviate from the allowable range SP2, and includes this in the control model by adding this to the state equation of Equation (1). Thereby, when the task processing unit 132 causes the second task to be executed by using the control model, the state vector $x_{v2}$ changes along the $X_B$-$X_C$ plane inside of the allowable range SP2 shown in FIG. 2.

When causing either of the first task and the second task to be executed, $x_1$ and $x_2$ that are the state variables along the axis $X_C$ are used in the model prediction control. However, as is obvious when comparing the allowable range SP1 and the allowable range SP2, the range allowed to $x_1$ and the like in the execution time of the first task, and the range allowed to $x_1$ and the like in the execution time of the second task are different from each other. For example, when $x_1$ is the state variable indicating the position of another vehicle traveling in the adjacent lane, the allowable range of $x_1$ becomes relatively large in the execution time of the first task that is "go straight", while the allowable range of $x_1$ becomes relatively small (for the purpose of avoiding collision) in the execution time of the second task that is "lane change".

In FIG. 2, "BD" represents an upper limit value along the axis $X_C$ in the allowable range SP2. The upper limit value like this is actually set individually for each of $x_1$ and $x_2$, but in FIG. 2, BD is drawn as a common upper limit value of $x_1$ and $x_2$ for simplification.

A state ST1 shown in FIG. 2 represents a state located inside of the allowable range SP1 of the first state space, and a state located on an upper side from BD. When the first task is executed in the state ST1 like this, if the task is switched and the execution of the second task is started immediately, the state variables $x_1$ and $x_2$ are in the state deviating from the allowable range SP2 at this time point. As a result, there is a possibility that an unfavorable event occurs such as collision with another vehicle.

Therefore, the task processing unit 132 of the control device 10 according to the present embodiment is configured to execute a transition process that is a process of making values of the state variables (that is, state variables $x_1$ and $x_2$ on the axis $X_C$) that are commonly included in both the first state space and the second state space within a predetermined range (that is, within the allowable range SP2 on the lower side than BD) that is allowed in the execution time of the second task, and thereafter start to cause the vehicle 20 to execute the second task.

Here, a state space containing both the first state space and the second state space, that is, the state space having six state variables constituted of $x_1$, $x_2$, $x_3$, $x_4$, $x_5$ and $x_6$ as elements will also be referred to as a "third state space" hereinafter. When a state vector that changes in the third state space is "$x_{v3}$", $x_{v3}$ is expressed as Equation (3) below.

[Expression 3]

$$x_{v3} = \begin{bmatrix} x_1 \\ x_2 \\ x_3 \\ x_4 \\ x_5 \\ x_6 \end{bmatrix} \quad (3)$$

In FIG. 2, a range assigned with reference sign "SP32" represents a range in which the elements such as $x_1$ are in both the allowable range SP1 and the allowable range SP2 in the above described third state space. Such a range of the third state space will also be referred to as an "allowable range SP32" hereinafter. When the above described transition process is executed, the state vectors indicating the states of the vehicle 20 and its surroundings change from the state ST1 to a state ST3 in FIG. 2. Since the state ST3 is inside of the allowable range SP32, the state ST3 is on a lower side from BD described above. Thus, the state variables $x_1$ and $x_2$ on the axis $X_C$ fall within the allowable range SP2 by the execution of the transition process.

After the transition process is executed, and thereby the state is brought into the state ST3, none of the state variables deviate from the allowable range SP2 even when the vehicle 20 is caused to start execution of the second task. Accordingly, switching to the second task is performed smoothly and safely. Thereafter, the state of the vehicle 20 and the like transitions to the state ST2 on the $X_A$-$X_C$ plane (that is, of the second state space).

Figure 3:
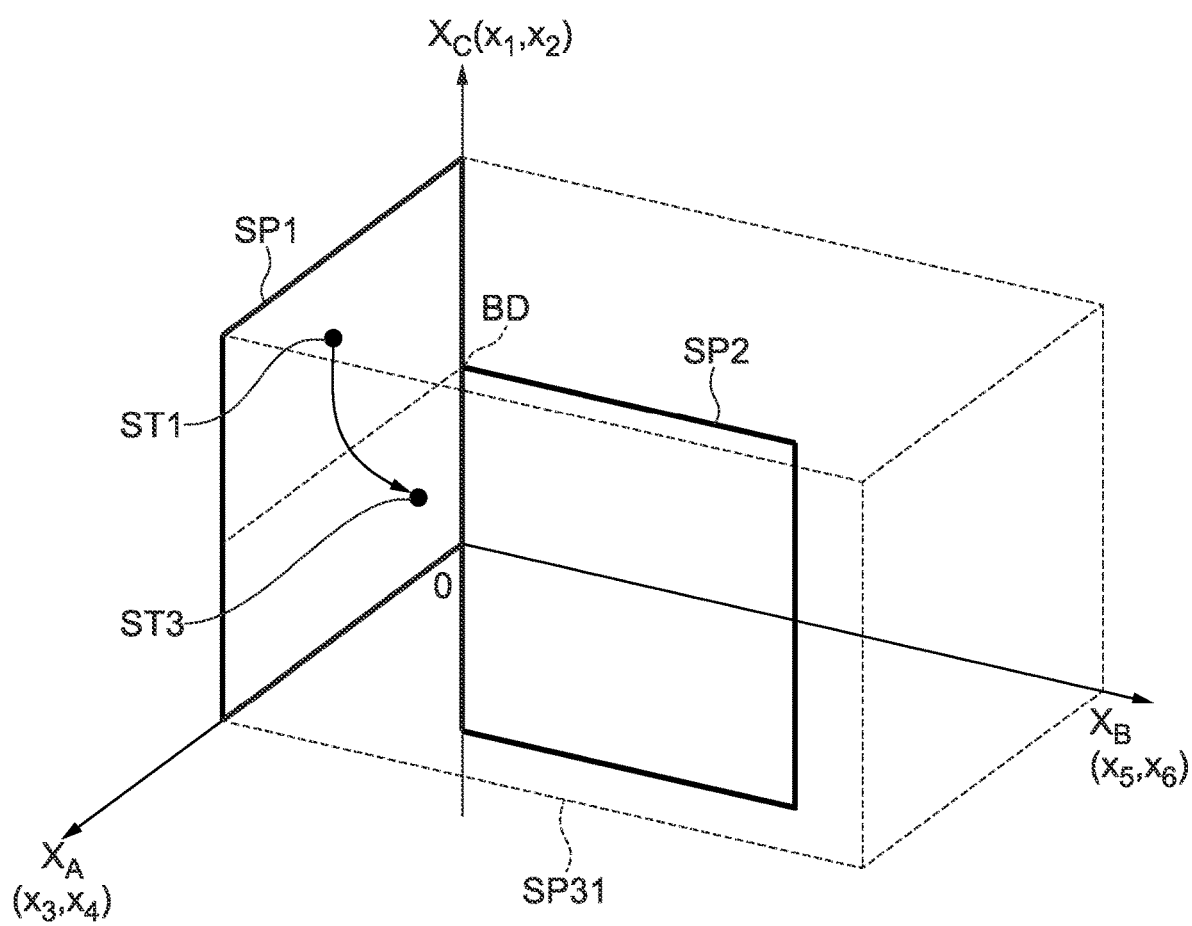
FIG. 3 is a diagram for explaining switching of a state space.

A specific method for the transition process will be described with reference to FIG. 3. Each of $X_A$, $X_B$, $X_C$, SP1, SP2, ST1 and ST3 shown in FIG. 3 is the same as that shown in FIG. 2.

An example of a case will be described, in which a switching request to the second task is transmitted from the general control unit 100 when the vehicle 20 is caused to execute the first task, and the state of the vehicle 20 and the like is the state ST1. At this time, a control signal transmitted to the control execution unit 130 from the task module unit 120 is switched to "lane change" of the second task from "go straight" of the first task.

Equation (4) below is an evaluation function that is used to calculate an evaluation value J in model prediction control, in the execution time of the first task. In the execution time of the first task, the task processing unit 132 causes the vehicle 20 to execute the first task while performing model prediction control so that a value of the evaluation value J calculated by using Equation (4) becomes minimum.

[Expression4]

$$J = J_1 + P_1 \quad (4)$$

The first term $J_1$ in a right side of Equation (4) is a term for calculating an index indicating a magnitude of consumed energy of the vehicle 20, which is a term that is expressed as a function of a value of a state vector or the like at each time point of a prediction horizon. By calculating the evaluation function by the equation including $J_1$, it is possible to suppress energy consumption of the vehicle 20 accompanying execution of the first task. As the evaluation function, a different function from the above can also be used. For example, the above $J_1$ may be formulated as a term for calculating an index (vibration energy and the like) indicating uncomfortableness in riding the vehicle 20.

The second term $P_1$ in a right side of Equation (4) is a term indicating a constraint condition in the execution time of the first task, which is a term expressing the constraint condition in a form of a penalty function. The allowable range SP1 shown in FIG. 3 is set by the penalty function. When some of the state variables deviate from the allowable range SP1, $P_1$ is calculated as a large value.

As described above, in the evaluation function pool 142 of the storage unit 140, many candidates for the evaluation function that is used in the execution time of the model prediction control are stored. In the constraint condition pool 143, many candidates for the constraint conditions in the execution time of the model prediction control are stored. Before starting the first task, the model generation unit 131 formulates the evaluation function as Equation (4) by selecting and using the evaluation function and the constraint condition that are suitable and correspond to the purpose from the above described candidates, and generates a control model by using the evaluation function and the state equation of Equation (1).

The same applies to the second task. Before starting the second task, the model generation unit 131 selects a suitable candidate corresponding to the purpose to formulate an evaluation function as in Equation (5) below, and generates a control model by using the evaluation function and the state equation of Equation (1). In Equation (5), $J_2$ is a term for calculating an index indicating a magnitude or the like of the consumption energy of the vehicle 20, and $P_2$ is a term indicating a constraint condition in the execution time of the second task. The allowable range SP2 shown in FIG. 3 is set based on the penalty function $P_2$.

[Expression5]

$$J = J_2 + P_2 \quad (5)$$

In the switching time from the first task to the second task, the model generation unit 131 formulates the second task as in Equation (5) and generates a control model. However, the task processing unit 132 does not immediately execute the model prediction control using the control model.

The model generation unit 131 formulates the second task as described above to generate the control model, and generates a control model that changes the state vectors in the third state space. The control model will also be referred to as a "intermediate control model" hereinafter. The model generation unit 131 sets the constraint condition so that the state vectors change in only some regions of the third state space instead of the entire third state space, and generates the above intermediate control model in a form including the constraint condition.

A range assigned with reference sign "SP31" in FIG. 3 represents the above described "some regions", that is, a range in which the state vectors can change in the execution time of the model prediction control using the intermediate control mode. The range will also be referred to as the "allowable range SP31" hereinafter. A constraint condition that defines the allowable range SP31 like this is formulated by the model generation unit 131 in the generation time of the intermediate control model. In the example shown in FIG. 3, the allowable range SP31 is a range obtained by extending the allowable range SP1 to an allowable range SP2 side along the axis $X_B$. The allowable range SP31 may be set as a different range from that of the example shown in FIG. 3 if it is a range that can include loci in which the state vectors change in the execution time of the transition process. For example, the entire third state space may be set as the allowable range SP31.

The model generation unit 131 formulates an evaluation function shown in Equation (6), for example, as a part of the intermediate control model. In Equation (6), the first term $J_3$ in a right side is a similar term to $J_1$ and $J_2$ described above, which is a term for calculating an index indicating the magnitude of energy consumption of the vehicle 20. The second term $P_2$ in the right side is the same as $P_2$ of Equation (5). In other words, $P_2$ is a penalty function indicating a constraint condition in the execution time of the second task.

[Equation6]

$$J = J_3 + P_2 \quad (6)$$

Before switching to the second task, the task processing unit 132 performs model prediction control by using the intermediate control model including the constraint condition like this. At this time, the state vectors change to a region on a lower side from BD in FIG. 3 due to an influence of the penalty function $P_2$. Thus, values $(x_1, x_2)$ of the state variables that are commonly included in both the first state space and the second state space change to fall within the allowable range SP2 that is allowed at the execution time of the second task. The state ST3 in FIG. 2 and FIG. 3 represents the state vectors after changing to the lower side from BD.

When the task processing unit 132 performs the model prediction control by using the intermediate control model including the penalty function $P_2$, the state vectors change to the region on the lower side from BD in FIG. 3 as described above. Accordingly, when the task processing unit 132 performs the model prediction control by using the above described intermediate control model, the process of making the values of the state variables ($x_1$, $x_2$) commonly included in both the first state space and the second state space within a predetermined range that is allowed at the execution time of the second task, that is, the "transition process" described above is executed in parallel. When control using the intermediate control model is performed, the transition process is resultantly performed, because the model generation unit 131 includes the predetermined constraint condition in the intermediate control model in advance. The "constraint condition" is the penalty function $P_2$ included in the evaluation function of Equation (5) that is used in the execution time of the second task as described above.

When the state vectors change to the state ST3, the task processing unit 132 starts the model prediction control using the control model that formulates the second task. Thereby, the task to be executed by the vehicle 20 is switched from the first task to the second task. This prevents the state variables $x_1$ and $x_2$ from deviating from the allowable range SP2 by switching, and it becomes possible to perform switching of the task smoothly and safely.

The allowable range SP31 in the execution time of the model prediction control using the intermediate control model can be said as a range of the state space that is temporarily extended by relaxing the constraint condition, from the allowable range SP1 in the execution time of the first task. In the present embodiment, it is made possible to execute the transition process of making the state variables within the predetermined range by performing calculation of the evaluation value J using the penalty function $P_2$ while executing the model prediction control in the state space that is extended like this.

Figure 4:
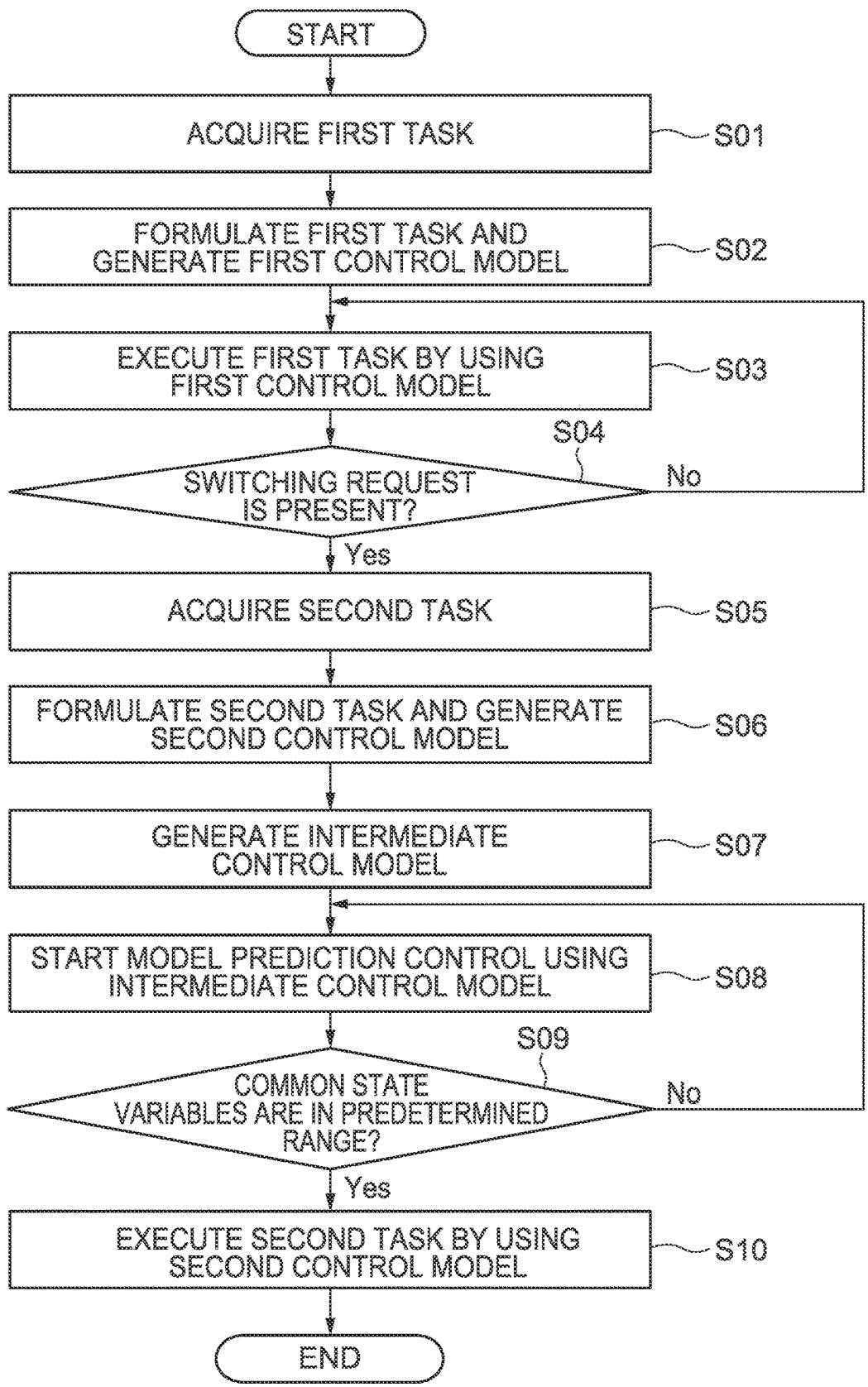
FIG. 4 is a flowchart showing a flow of processes executed by the control device according to the present embodiment.

A flow of a specific process that is executed by the control device 10 to realize switching of the task as above will be described with reference to a flowchart in FIG. 4. A series of processes shown in FIG. 4 is started to be executed by the control device 10 at a timing at which the signal instructing the start of execution of the first task is transmitted from the general control unit 100.

In first step S01, a process of acquiring the first task that is an initial task is performed based on the signal transmitted via the task module unit 120 from the general control unit 100. In this example, the control device 10 acquires the first task and a content of control required therefor based on a control command that is inputted via the block (go straight) assigned with reference sign 121 in FIG. 1.

In step S02 following step S01, a process of formulating the first task is executed by the model generation unit 131. As described above, the model generation unit 131 formulates the first task in a format including the state equation of Equation (1) and the evaluation function of Equation (4), and thereby generates a control model. The control model generated here, that is, the control model generated by formulating the first task will also be referred to as the "first control model" hereinafter.

In step S03 following step S02, the task processing unit 132 starts the model prediction control using the first control model, and thereby starts to cause the vehicle 20 to execute the first task. As described above, the state vectors at this time change along the $X_A$-$X_C$ plane (that is, the first state space) in FIG. 2. Since the first control model includes the constraint condition constituted of the penalty function $P_1$, the state vectors change inside of the allowable range SP1.

In step S04 following step S03, it is determined whether or not there is a switching request to another task from the first task that is currently executed. When there is not a change in the task requested by the general control unit 100, the process of step S03 and the following step is executed again, and execution of the first task is continued in the vehicle 20. When the task requested by the general control unit 100 is switched to the other task, the flow shifts to step S05.

In step S05, a process of acquiring the second task that is the next task is performed based on the signal transmitted via the task module unit 120 from the general control unit 100. In this example, the control device 10 acquires the second task and a content of control required therefor based on the control command inputted via the block (lane change) assigned with reference sign 122 in FIG. 1.

In step S06 following step S05, a process of formulating the second task is executed by the model generation unit 131. As described above, the model generation unit 131 formulates the second task in the format including the state equation of Equation (1) and the evaluation function of Equation (5), and thereby generates the control model. The control model generated here, that is, the control model generated by formulating the second task will also be referred to as the "second control model" hereinafter. In this way, when switching of the task is required by the general control unit 100, the model generation unit 131 formulates the second task after switching to generate the second control model.

However, the model prediction control using the second control model is not started at this point of time.

In step S07 following step S06, the processing of generating the intermediate control model is executed by the model generation unit 131. As described above, the intermediate control model is a control model that changes the state vectors inside of the allowable range SP31, in the third state space.

In step S08 following step S07, the task processing unit 132 starts the model prediction control using the intermediate control model. As described above, the state vectors at this time change from the state ST1 to the state ST3 on the lower side from the boundary BD, inside of the allowable range SP31 shown in FIG. 3. The reason why the state vectors change in this way is that the evaluation function of the intermediate control model includes the penalty function $P_2$. The above described process that is performed in step S08 corresponds to the "transition process" in the present embodiment.

In step S09 following step S08, it is determined whether or not the respective values of the state variables (that is, the state variables $x_1$ and $x_2$ on the axis $X_C$) commonly included in both the first state space and the second state space fall within the range on the lower side from BD. In other words, it is determined whether or not the state vectors fall inside of the allowable range SP32 shown in FIG. 2.

When the respective values of the state variables $x_1$ and $x_2$ fall in the range on the lower side from the boundary BD, the flow shifts to step S10. Otherwise, the process of step S08 and the following step is executed again.

In step S10, the model prediction control using the second control model generated in step S06 is started. Thereby, the task to be executed by the vehicle 20 is switched to the second task smoothly and safely.

By performing the processes as above, the control device 10 can cause the vehicle 20 to execute various kinds of tasks sequentially. In the execution time of each of the tasks, a minimum scale control model corresponding to the task is generated, and the model prediction control using the control model is executed. Since redundancy of the control system to include many tasks is not required, the load on the control device 10 can be suppressed as compared with the conventional art. When a new task is desired to be added as the task to be executed by the vehicle 20, a new software module can be added to the task module unit 120. In this way, the control device 10 has sufficient extensibility (scalability). Even when the executable tasks increase, the control system such as the state space does not become huge in response to this, so that the processing load on the control device 10 does not increase.

When switching the task to be executed by the vehicle 20, the model prediction control using the intermediate control model is executed, and thereby the transition process is executed. In the intermediate control model, the state space is extended to the third state space containing both the first state space and the second state space. Therefore, the number of state variables and the like included in the control model increases, and the processing load on the control device increases. However, since increase of the processing load is temporary in the execution time of the transition process, the processing load on the control device is suppressed on average.

Formulation of the first task in step S02 and formulation of the second task in step S06 in FIG. 4 may be performed at timings when the respective steps are processed, but may be performed in advance at previous time points before those timings.

In other words, at a time point before the task execution request is issued from the general control unit 100, the control model formulating each of the tasks is generated in advance, and the control model may be stored in the storage unit 140. The same applied to generation of the intermediate control model in step S07.

In this case, in step S02 or the like in FIG. 4, the existing control model can be read from the storage unit 140 and used. In this way, in each of steps S02, S06 and S07, reading the existing control models from the storage unit 140 is also included in the process of "generating" the control model by the model generation unit 131.

The present embodiment is described thus far with reference to the specific examples. However, the present disclosure is not limited to these specific examples. These specific examples to which a person skilled in the art properly adds design changes are also included in the scope of the present disclosure, as long as the features of the present disclosure are included. The respective elements included by the aforementioned respective specific examples, and arrangements, conditions and the shapes thereof, etc. are not limited by those illustrated herein and can be properly changed. The combination of the respective elements included by the aforementioned respective specific examples can be properly changed as long as no technical contradiction arises.

The control device and the control method described in the present disclosure may be realized by one or more dedicated computers provided by configuring a processor programmed to execute one or more functions embodied by a computer program, and a memory. The control device and the control method described in the present disclosure may be realized by a dedicated computer provided by configuring a processor including one or more dedicated hardware logic circuits. The control device and the control method described in the present disclosure may be realized by one or more dedicated computers configured by a combination of a processor programmed to execute one or more functions and a memory, and a processor including one or more hardware logic circuits. The computer program may be stored in a computer-readable non-transition tangible recording medium as an instruction to be executed by a computer. The dedicated hardware logic circuit and the hardware logic circuit may be realized by a digital circuit or an analogue circuit including a plurality of logic circuits.

What is claimed is:

1. A control device that is a control device for a vehicle, comprising:
   a model generation unit that generates a control model that formulates a task to be executed by the vehicle; and
   a task processing unit that causes the vehicle to execute the task by performing model prediction control using the control model, wherein
   when the task to be executed by the vehicle is switched from a first task to a second task, assuming that
      a first state space is a state space of the control model used at an execution time of the first task, and
      a second state space is a state space of the control model used at an execution time of the second task,
   the first state space has a first allowable range formed by first state variables,
   the second state space has a second allowable range formed by second state variables,
   the first state variables and the second state variables have common state variables forming a common state space,
   the task processing unit limits the first allowable range to determine a predetermined range, and causes the common state variables of the predetermined range to be included in the second allowable range,
   the task processing unit executes a transition process of executing the first task within the predetermined range, and
   the task processing unit executes the second task after executing the transition process.

2. The control device according to claim 1, wherein
   when the task to be executed by the vehicle is switched from the first task to the second task,
      assuming that a third state space is a state space containing both the first state space and the second state space,
      the model generation unit generates an intermediate control model that is the control model that changes a state vector in a region including the first allowable range of the third state space, and
      the task processing unit executes the transition process while performing model prediction control using the intermediate control model.

3. The control device according to claim 2, wherein the model generation unit includes a predetermined constraint condition in the intermediate control model so that the transition process is executed by the task processing unit.

4. The control device according to claim 3, wherein the model generation unit includes a penalty function included in an evaluation function that is used at the execution time of the second task, in the intermediate control model as the constraint condition.

5. The control device according to claim 1, further comprising a storage unit in which a model element that is used in generation of the control model is stored.

* * * * *